United States Patent [19]

Mizutani et al.

[11] Patent Number: 5,375,933
[45] Date of Patent: Dec. 27, 1994

[54] ROLLING CONTACT BEARING PROTECTED AGAINST ELECTROLYTIC CORROSION

[75] Inventors: Tsutomu Mizutani, Kuwana; Masakazu Hirata, Inabe, both of Japan

[73] Assignee: NTN Corporation, Osaka, Japan

[21] Appl. No.: 986,819

[22] Filed: Dec. 8, 1992

[51] Int. Cl.⁵ .................. F16C 19/50; F16C 33/62
[52] U.S. Cl. ........................ 384/476; 384/492
[58] Field of Search .............. 384/476, 492, 909

[56] References Cited

U.S. PATENT DOCUMENTS 4,193,645  3/1980  Baker et al. ............... 384/909 X
4,263,695  4/1981  Duncan et al. ............. 384/909 X
4,997,293  3/1991  Ono et al. ..................... 384/476
5,059,041  10/1991 Watanabe et al. .............. 384/476

FOREIGN PATENT DOCUMENTS 55-10111  1/1980  Japan .
4-4311    1/1992  Japan ........................ 384/492

Primary Examiner—Thomas R. Hannon
Attorney, Agent, or Firm—Nikaido Marmelstein Murray & Oram

[57] ABSTRACT

A rolling contact bearing has inner and outer rings, at least one of them coated with an insulating film for protecting the bearing against electrolytic corrosion. The insulating film is made of polyphenylene sulphide resin containing glass fiber.

2 Claims, 1 Drawing Sheet

ROLLING CONTACT BEARING PROTECTED AGAINST ELECTROLYTIC CORROSION

BACKGROUND OF THE INVENTION

This invention relates to a rolling contact bearing coated with an insulating film to improve resistance to electrolytic corrosion.

In order to prevent electrolytic corrosion which may occur between bearing rings and rolling elements, it is a known practice to provide insulating coatings or films on the surfaces of bearing rings of a rolling contact bearing such as a ball bearing or a roller bearing, thus preventing a current from flowing to the bearing rings from outside. (e.g. Japanese Utility Model Application 63-165244)

Since such insulating coatings are formed on a bearing adapted to be mounted between a rotary shaft and a housing with a predetermined interference, they are required to be sufficiently low in water absorption so that they will not suffer dimensional changes and also to have a high creep resistance enough to prevent and decrease in the thickness of the insulating films and thus to keep the interference of the bearing unchanged.

Also, such insulating films are required to be sufficiently heat-resistant so that they will not suffer deformation or change in properties even if the bearing is subjected to high temperatures while being rotated at high speed. Further, their moldability has to be sufficiently high so that they can be mass-produced at low cost.

Engineering plastics are now drawing much attention as materials for functional parts of mechanical or electrical parts. Among such plastics, polyamide 66 (hereinafter referred to as PA66), polyamide 6 (PA6), polybutylene terephthalate (PBT) and polyethylene terephthalate (PET) are known as materials having high insulation properties and thus suitable for use as insulating films. But, an insulating film made of such materials has a problem in that they do not meet the requirements completely.

Namely, though it is possible to increase the creep resistance of PA66 and PA6 by adding glass fiber as a reinforcing material, these materials have a problem in that their water absorption coefficient is so high that their dimensions tend to change remarkably, Also, their insulation properties tend to change with temperature, so that they show unstable insulating performance.

On the other hand, PBT and PET are low in water absorption and thus are less likely to suffer dimensional changes and decline in insulation properties. But their heat resistance and creep resistance are not sufficient as materials for insulating films.

Namely, while an insulating film to be formed on a bearing adapted for high-speed operation is required to withstand a temperature of about 150° C., the tensile strength of PBT and PET reduces to half at a lower temperature than 150° C. Thus, no sufficient strength is obtainable at high temperatures.

If glass fiber is added to these materials to increase the creep resistance, their moldability will worsen markedly (this is especially true with PET), Thus, it is difficult to form these materials into a thin insulating film by injection molding.

An object of the present invention is to provide a bearing coated with insulating films which can protect the bearing against electrolytic corrosion and have excellent insulating properties.

SUMMARY OF THE INVENTION

In order to solve the above problems, there is provided a rolling contact bearing having rings each coated with an insulating film for protecting the bearing against electrolytic corrosion, the insulating film being made of polyphenylene sulphide resin (hereinafter referred to as PPS) containing glass fibers.

PPS has an extremely low water absorption coefficient (0.02% by volume or less after immersing it in water kept at 23° C. for 24 hours, whereas that of PA66 and PA6 is about 1% by volume). Thus, its insulation properties are kept high because it scarcely absorbs water.

Moreover, the tensile strength of PPS decreases in half at 200° C. In other words, it keeps high tensile strength at 150° C., It maintains excellent temperature characteristics even after it has been used continuously for a long time.

Further, by adding glass fiber to PPS, its creep resistance increases markedly. This makes it possible to keep the interference of the bearing constant. Also, because of high creep resistance of the films, their thickness is less likely to decrease, so that their insulation properties are kept high.

The greater the content of glass fibers, the lower the moldability of PPS. The smaller the content, however, the lower the creep resistance of PPS. Thus, the content of glass fibers has to be determined so that PPS is injection-moldable and at the same time its creep resistance is kept reasonably high. More specifically, the content of glass fibers in PPS should preferably be 30–60% by volume.

The insulating film according to this invention has a low water absorption and is high in creep resistance and heat resistance and can protect the bearing against electrolytic corrosion stably.

Since PPS has good moldability, it can be easily formed into a thin integral film by injection molding. Thus, the insulation film according to the present invention can be mass-produced at low cost.

Other features and objects of the present invention will become apparent from the following description taken with reference to the accompanying drawings, in which:

DETAILED DESCRIPTION OF THE PREFERRED EMBODIMENT

Figure 1:
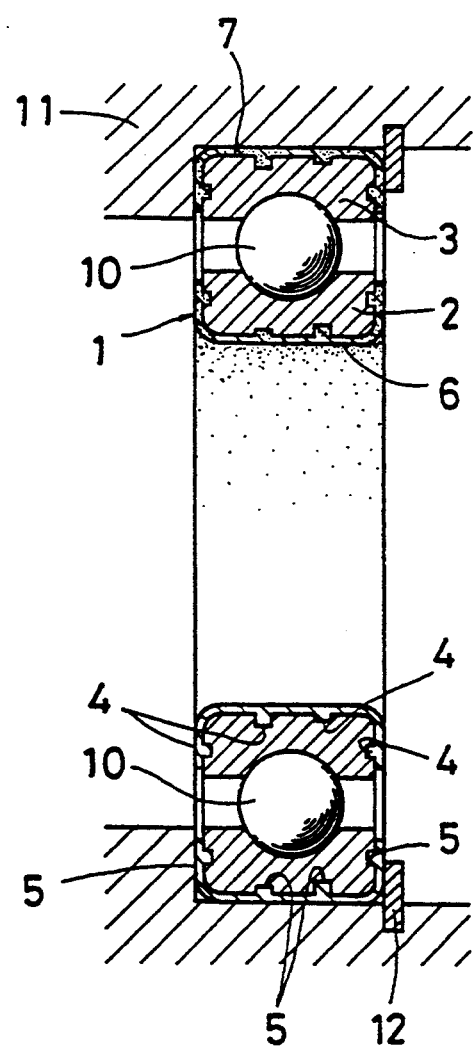
FIG. 1 is a vertical sectional side view showing the rolling contact bearing of an embodiment.

FIG. 1 shows a rolling contact bearing of the embodiment.

A rolling contact bearing 1 comprises an inner ring 2 and an outer ring 3 formed with a plurality of circumferential grooves 4 and 5, respectively, and coated with insulating films 6 and 7.

The insulating films 6 and 7 are made of polyphenylene sulphide (PPS) resin containing 40% by volume of glass fibers and are provided, respectively, with a plurality of ribs 8 and 9 which engage in the circumferential grooves 4 and 5.

In the figure, numeral 10 designates balls as rolling elements. The bearing 1 is accommodated in a housing 11 and is prevented from coming off by a ring 12.

Figure 2A:
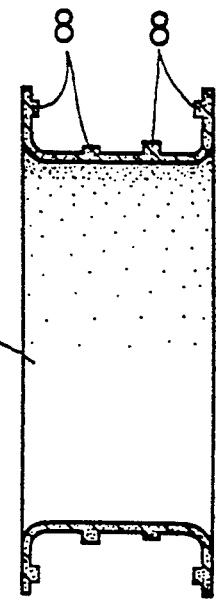
FIGS. 2a and 2b are side views showing the insulating films of the same.
Figure 2B:
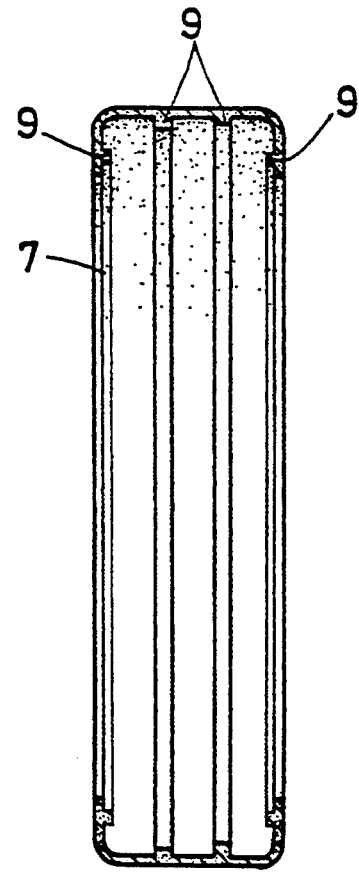

In forming the bearing 1, circumferential grooves 4 and 5 are formed by machining the surfaces of inner and outer ring materials 2 and 3 for a standard bearing. The insulating films 6 and 7 are annular members having the ribs 8 and 9, respectively, as shown in FIGS. 2A and 2B. They are integrally formed by injection molding PPS. After treating the surfaces of the inner and outer rings 2 and 3 of the bearing 1, the insulating films 6 and 7 are fixed thereto by baking, coating or flame spray coating.

In this state, the ribs 8 and 9 engage in the circumferential grooves 4 and 5 of the inner and outer rings 2 and 3, thus preventing the axial displacement, peeling and separation of the insulating films 6 and 7.

It was confirmed that the insulating films formed on the bearing 1 of the above embodiment absorb far less water than those made of PA66 or PA6. Thus, their dimensions changed very little and the interference of the bearing was maintained at a predetermined level stably over a prolonged period of time.

Also, it was confirmed that even at high temperatures. the insulating films suffered no creeping and revealed stable insulating properties at any working temperatures.

What is claimed is:

1. A rolling contact bearing, comprising:
   an inner ring;
   an outer ring; and
   an injection-molded insulating film formed at least on said outer ring on top., outer and bottom peripheral surfaces thereof so as to protect the bearing against electrolytic corrosion, said insulating film being made of polyphenylene sulphide resin containin glass fibers.

2. A rolling contact bearing, comprising:
   an inner ring having defined at least along an inner peripheral surface thereof circumferential grooves;
   an outer ring having defined at least along an outer peripheral surface thereof circumferential grooves;
   a first injection-molded insulating film formed on said inner ring on top, inner and bottom peripheral surfaces thereof; and
   a second injection-molded insulating film formed at least on said outer ring on top, outer and bottom peripheral surfaces thereof, said first and second insulating films being formed so as to protect the bearing against electrolytic corrosion, said insulating films being made of polyphenylene sulphide resin containing glass fibers.

* * * * *